United States Patent
Phadke

(10) Patent No.: US 9,712,080 B2
(45) Date of Patent: *Jul. 18, 2017

(54) REDUCING PHASE CURRENT IMBALANCES IN SINGLE PHASE REDUNDANT POWER SUPPLY SYSTEMS WITH UNBALANCED LOADS

(71) Applicant: ASTEC INTERNATIONAL LIMITED, Kowloon (HK)

(72) Inventor: Vijay Gangadhar Phadke, Pasig (PH)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 13/803,893

(22) Filed: Mar. 14, 2013

(65) Prior Publication Data
US 2014/0268947 A1 Sep. 18, 2014

(51) Int. Cl.
H02M 7/08 (2006.01)
H02M 7/23 (2006.01)
H02J 1/10 (2006.01)
H02J 3/26 (2006.01)

(52) U.S. Cl.
CPC ............. *H02M 7/23* (2013.01); *H02J 1/102* (2013.01); *H02J 3/26* (2013.01); *Y02E 40/50* (2013.01)

(58) Field of Classification Search
CPC ........ H02M 7/08; H02M 7/2173; H02M 7/23; Y02E 40/50; H02J 3/26
USPC ...... 363/65, 67, 69, 70, 87, 129, 76, 77, 81, 363/84, 89, 92, 125, 127, 128; 307/14, 307/24, 53, 54, 58, 60, 82; 323/225, 268, 323/350
See application file for complete search history.

(56) References Cited

U.S. PATENT DOCUMENTS

| | | | | |
|---|---|---|---|---|
| 5,319,536 A | * | 6/1994 | Malik | .............................. 363/65 |
| 5,917,719 A | * | 6/1999 | Hoffman et al. | ............... 363/84 |
| 5,991,173 A | * | 11/1999 | Nishikawa | .............. H02M 7/49 363/37 |
| 6,014,322 A | * | 1/2000 | Higashi et al. | ................. 363/65 |
| 6,038,152 A | | 3/2000 | Baker | |

(Continued)

OTHER PUBLICATIONS

Yao et al., Design and Analysis of the Droop Control Method for Parallel Inverters Considering the Impact of the Complex Impedance on the Power Sharing, Feb. 2011, pp. 576-588.

(Continued)

*Primary Examiner* — Alex Torres-Rivera
(74) *Attorney, Agent, or Firm* — Harness, Dickey & Pierce, P.L.C.

(57) ABSTRACT

A system includes first and second pluralities of single phase AC/DC power supplies each having an input for coupling to first and second phase voltages, respectively, in a polyphase power distribution system. The outputs of the power supplies are electrically connected in parallel for supplying DC current to a load at a substantially constant voltage. The system further includes a controller coupled to at least the first plurality of power supplies and configured to increase the DC current supplied to the load by at least one of the first plurality of power supplies in response to another one of the first plurality of power supplies shutting down. Various other systems, power supplies, controllers and methods are also disclosed.

29 Claims, 11 Drawing Sheets

(56) References Cited

U.S. PATENT DOCUMENTS

| | | | |
|---|---|---|---|
| 6,320,771 B1* | 11/2001 | Hemena | H02J 1/102 323/272 |
| 6,707,285 B2* | 3/2004 | Telefus | H02M 1/10 323/300 |
| 6,731,524 B2 | 5/2004 | Elek et al. | |
| 6,903,946 B1* | 6/2005 | Wu | H02M 3/1584 363/65 |
| 7,230,406 B2 | 6/2007 | Huang et al. | |
| 7,256,516 B2 | 8/2007 | Buchanan et al. | |
| 7,492,058 B2* | 2/2009 | Chen | H02J 9/062 307/64 |
| 7,577,006 B2 | 8/2009 | Neacsu | |
| 7,715,215 B1* | 5/2010 | Bosco et al. | 363/67 |
| 7,761,910 B2 | 7/2010 | Ransom et al. | |
| 7,898,104 B1 | 3/2011 | Verges | |
| 7,986,062 B2 | 7/2011 | Jakeman et al. | |
| 9,189,040 B2* | 11/2015 | Phadke | G06F 1/26 |
| 2001/0040812 A1* | 11/2001 | Jitaru | 363/21.06 |
| 2011/0187341 A1* | 8/2011 | Chiu | G05F 1/618 323/285 |
| 2011/0235379 A1* | 9/2011 | Siri | H02M 7/08 363/125 |
| 2011/0254531 A1* | 10/2011 | Markowski | 323/371 |
| 2013/0066478 A1 | 3/2013 | Smith | |
| 2013/0162042 A1* | 6/2013 | Phadke et al. | 307/43 |
| 2013/0163297 A1* | 6/2013 | Phadke et al. | 363/65 |

OTHER PUBLICATIONS

Roslan et al., Improved Instantaneous Average Current-Sharing Control Scheme for Parallel-Connected Inverter Considering Line Impedance Impact in Microgrid Networks, Mar. 2011, pp. 702-716.

* cited by examiner

REDUCING PHASE CURRENT IMBALANCES IN SINGLE PHASE REDUNDANT POWER SUPPLY SYSTEMS WITH UNBALANCED LOADS

FIELD

The present disclosure relates to reducing phase current imbalances in single phase redundant power supply systems with unbalanced loads.

BACKGROUND

This section provides background information related to the present disclosure which is not necessarily prior art.

Three phase power systems are often used to supply electric power to single phase loads. For example, in large data centers, the individual phases of a three phase power supply are connected to various single phase loads such as printers, scanners, computer servers, etc. Each of these loads includes one or more single phase power supplies. Ideally, the individual loads are equally distributed among the various power phases so that phase currents are substantially balanced. Otherwise, a significant amount of current may flow in the neutral conductor, resulting in losses and requiring heavy copper conductors, which are expensive.

SUMMARY

This section provides a general summary of the disclosure, and is not a comprehensive disclosure of its full scope or all of its features.

According to one aspect of the present disclosure, a system includes a first plurality of power supplies each having an input for coupling to a first phase voltage in a polyphase power distribution system and an output for supplying DC current to a load at a substantially constant voltage, a second plurality of power supplies each having an input for coupling to a second phase voltage in the polyphase power distribution system and an output for supplying DC current to a load at a substantially constant voltage, and a controller coupled to at least the first plurality of power supplies. The outputs of the first plurality of power supplies and the second plurality of power supplies are electrically connected in parallel. The first plurality of power supplies and the second plurality of power supplies are single phase AC/DC power supplies. The controller is configured to increase the DC current supplied to the load by at least one of the first plurality of power supplies in response to another one of the first plurality of power supplies shutting down.

According to another aspect of this disclosure, a controller is disclosed for a system including a first plurality of power supplies each having an input for coupling to a first phase voltage in a polyphase power distribution system and an output for supplying DC current to a load at a substantially constant voltage, and a second plurality of power supplies each having an input for coupling to a second phase voltage in the polyphase power distribution system and an output for supplying DC current to a load at a substantially constant voltage. The outputs of the first plurality of power supplies and the second plurality of power supplies electrically connected in parallel. The first plurality of power supplies and the second plurality of power supplies are single phase AC/DC power supplies. The controller is configured to increase the DC current supplied to the load by at least one of the first plurality of power supplies in response to another one of the first plurality of power supplies shutting down.

According to yet another aspect of this disclosure, a method of inhibiting phase current imbalances in a polyphase power distribution system is disclosed. The system includes a first plurality of power supplies each having an input for coupling to a first phase voltage and an output for supplying DC current to a load at a substantially constant voltage, and a second plurality of power supplies each having an input for coupling to a second phase voltage and an output for supplying DC current to a load at a substantially constant voltage. The outputs of the first plurality of power supplies and the second plurality of power supplies are electrically connected in parallel. The first plurality of power supplies and the second plurality of power supplies are single phase AC/DC power supplies. The method includes increasing the DC current supplied to the load by at least one of the first plurality of power supplies in response to another one of the first plurality of power supplies shutting down.

According to further aspects of the present disclosure, methods of operating single phase power supplies, controllers and other devices, and methods of avoiding or reducing phase current imbalances in polyphase power distribution systems, are disclosed herein.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
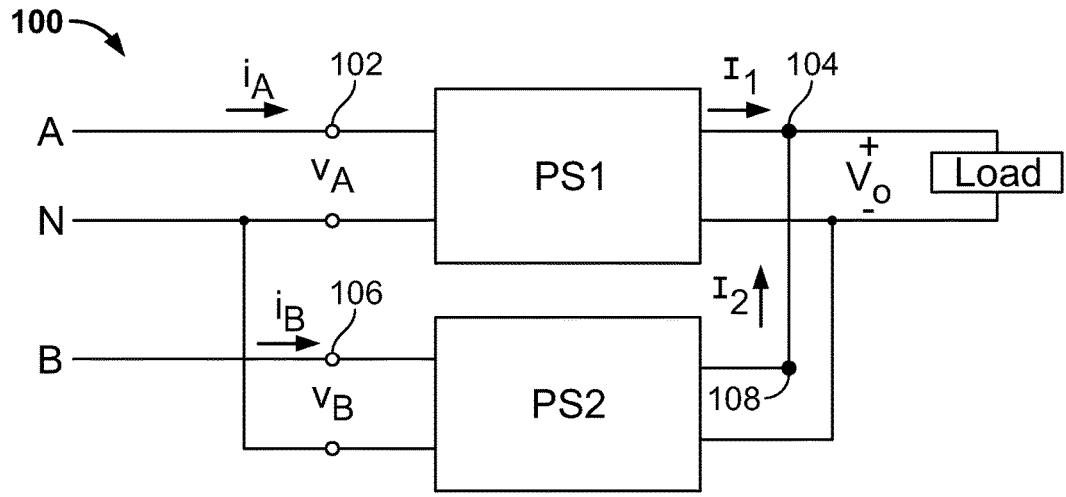
FIG. 1 is a block diagram of a redundant single phase power supply system according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A system according to one example embodiment of the present disclosure is illustrated in FIG. 1 and indicated generally by reference number 100. As shown in FIG. 1, the system 100 includes a first power supply PS1 and a second power supply PS2. The first power supply PS1 includes an input 102 coupled to a first phase voltage vA in a polyphase power distribution system, and an output 104 coupled to a load for supplying an amount of DC power to the load. Similarly, the second power supply PS2 includes an input 106 coupled to a second phase voltage vB in the polyphase power distribution system, and an output 108 coupled to the load for supplying an amount of DC power to the load. The outputs 104, 108 are coupled in parallel. At least the first power supply PS1 is configured to reduce phase current imbalances in the polyphase power distribution system by adjusting the amount of DC power supplied to the load by the first power supply PS1 and the amount of DC power supplied to the load by the second power supply PS2. In this manner, the amount of input current iA drawn by the first power supply PS1 at the first phase voltage vA and the amount of input current iB drawn by the second power supply PS2 at the second phase voltage vB may be adjusted to reduce phase current imbalances in the polyphase power distribution system.

The polyphase power distribution system may be, for example, a two phase power distribution system, a three phase power distribution system, or a power distribution system having more than three phases. When a three phase power distribution system is employed, the phase shift between each of the three phases is typically one hundred twenty degrees.

Each power supply PS1, PS2 may be configured to reduce or avoid phase current imbalances in the polyphase power distribution system based on one or more detected phase currents or voltages, and/or in another suitable manner, such as in response to control signals from an onboard or external controller. Some examples are described below.

In the system 100 of FIG. 1, the power supplies PS1, PS2 may be configured to supply DC current to the load at a substantially constant (i.e., regulated) output voltage Vo. In that event, the amount of DC power supplied to the load by each power supply may be adjusted by adjusting the amount of DC current I1, I2 supplied to the load by each power supply PS1, PS2. Alternatively, each power supply PS1, PS2 may be configured to provide, e.g., a substantially constant output current to the load. In that case, the amount of DC power supplied to the load by a given power supply may be adjusted by adjusting its DC output voltage and/or output current.

One way to adjust the amount of DC current supplied to the load by a given power supply is by adjusting its regulated output voltage level. For example, if both power supplies PS1 and PS2 are providing a 5 VDC output to the load, the first power supply PS1 may be configured to increase or decrease its regulated output voltage level (e.g., to 5.1 or 4.9 VDC), to become more or less competitive with the second power supply PS2, and increase or decrease the amount of DC current I1 (and DC power) supplied to the load by the first power supply PS1.

In the example embodiment illustrated in FIG. 1, where only two power supplies PS1, PS2 are coupled in parallel to the load, adjusting the amount of DC current I1 (and power) supplied to the load by the first power supply PS1 can adjust the amount of DC current I2 (and power) supplied to the load by the second power supply PS2 in an equal but opposite amount, assuming the load demand is constant during this time. For example, if the DC current I1 is increased by one ampere, the DC current I2 may automatically decrease by one ampere. Therefore, the amount of phase current iA drawn by the first power supply PS1 at the first phase voltage vA will increase, and the amount of phase current iB drawn by the second power supply PS2 at the second phase voltage vB will decrease.

Accordingly, by adjusting the amount of DC current (and power) it supplies to the load, the first power supply PS1 can adjust: the amount of DC current (and power) supplied to the load by the second power supply PS2, without changing the overall amount of power supplied to the load; the amount of phase current iA drawn by the first power supply PS1 at the first phase voltage vA; and the amount of phase current iB drawn by the second power supply PS2 at the second phase voltage vB to reduce phase current imbalances in the polyphase power distribution system.

With further reference to FIG. 1, the first power supply PS1 may be configured to reduce differences between the input phase currents iA, iB provided to the inputs 102, 106 of the power supplies PS1, PS2. Alternatively, one or both power supplies PS1, PS2 may be configured to reduce phase current imbalances at other locations in the power distribution system.

Each power supply PS1, PS2 may be configured to adjust the amount of DC power it supplies to the load in response to the voltage level of its input phase voltage vA, vB. For example, suppose both power supplies PS1, PS2 are designed for a nominal input phase voltage of 230 VAC. In that event, if the power supplies PS1, PS2 operate at the same efficiency and provide the same amount of DC output current to the load at the output voltage Vo, one may expect their input phase currents iA, iB to be the same. If, however, the phase voltage vA coupled to input 102 is, e.g., only 225V while the phase voltage vB coupled to input 106 is 230V, the first power supply PS1 may draw more phase current than the second power supply PS2 to generate the same output power due, e.g., to the negative resistance characteristic of a power supply maintaining a constant output voltage. To address this issue, the first power supply PS1 may be configured to decrease the DC current I1 it supplies to the load, and thereby increase the DC current I2 supplied to the load by the second power supply, in response to the voltage level of the input phase voltage vA.

For example, if the first and second power supplies PS1, PS2 are intended to provide a 5 VDC output, the first power supply PS1 may be configured (e.g., via a look up table) to regulate its output voltage level at 4.9 VDC in response to an input phase voltage of 225V. This will make the power supply fed by the relatively higher phase voltage (i.e., the second power supply PS2) more competitive than the power supply fed by the lower phase voltage (i.e., the first power supply PS1). As a result, the output current I1 and the input phase current iA will decrease, and the output current I2 and the input phase current iB will increase (assuming the second power supply PS2 is regulating a greater output voltage level, such as 5 VDC, during this time).

Similarly, the first power supply PS1 may be configured to adjust the amount of DC power it supplies to the load in response to the difference between its input phase voltage and a nominal phase voltage. For example, the first power supply PS1 may be configured to adjust its constant output voltage level by an amount proportional to the difference between the input phase voltage and the nominal phase voltage (e.g., stored in memory) to thereby adjust the amount of DC current (and power) supplied to the load by each power supply PS1, PS2. Accordingly, if the phase voltage vA is only 225 VAC as compared to a nominal phase voltage of 230 VAC, the first power supply PS1 may be configured to adjust its constant output voltage level to 5 VDC*225/230, or 4.89 VDC. It should be understood that the specific values mentioned herein (e.g., 4.89 VDC, 4.9 VDC, 5 VDC, 225 VAC and 230 VAC) are merely examples, and that other values may be used in any given implementation of these teachings.

Figure 2:
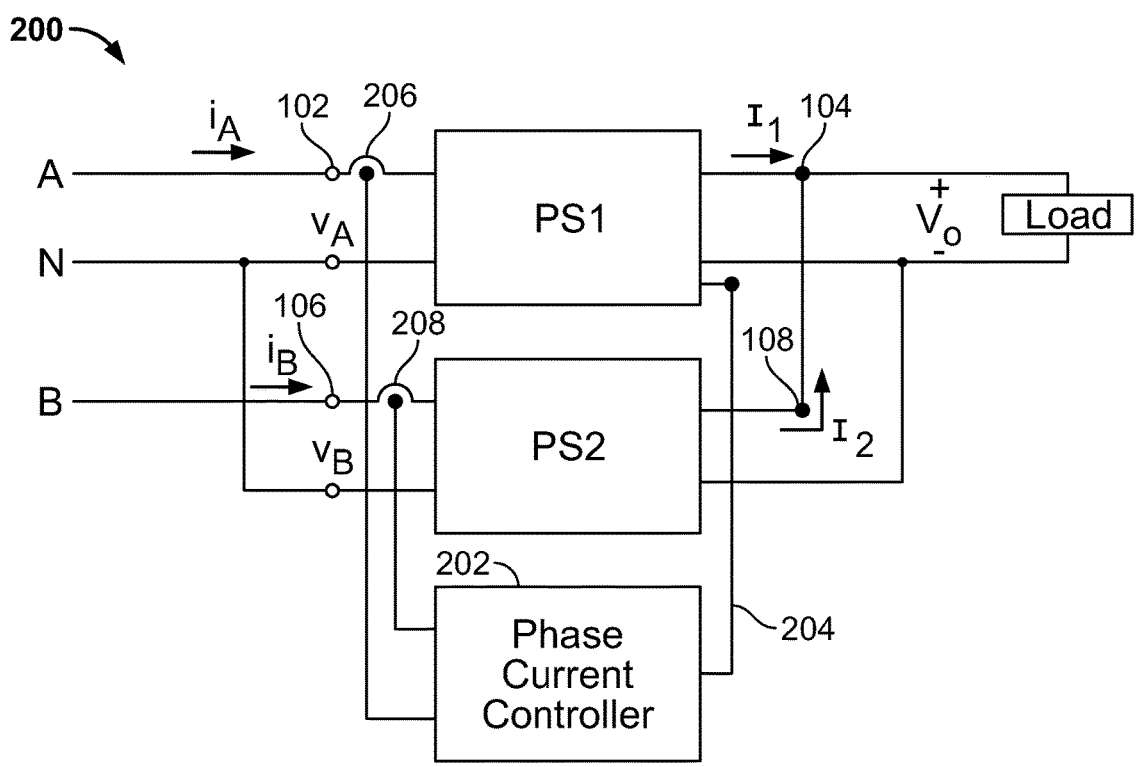
FIG. 2 is a block diagram of another example system having a phase current controller coupled to one of the power supplies shown in FIG. 1.
Figure 3:
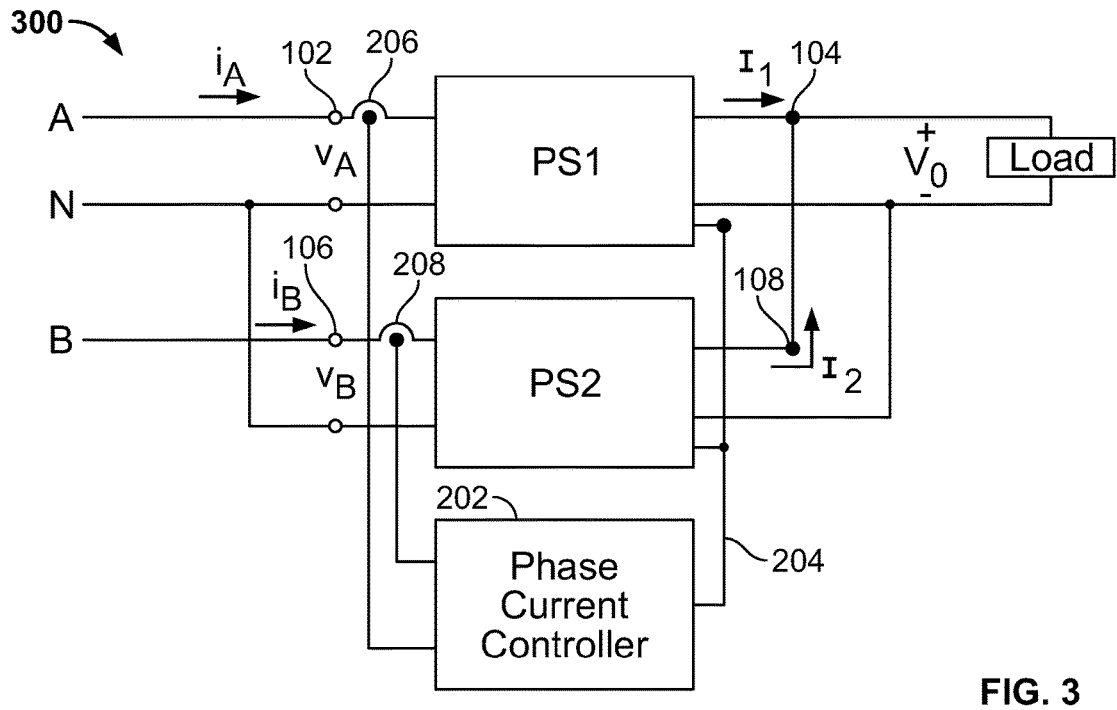
FIG. 3 is a block diagram of an example system having a phase current controller coupled to both of the power supplies shown in FIG. 1.

FIG. 2 illustrates a system 200 according to another example embodiment of the present disclosure. The system 200 includes a phase current controller 202 coupled to the first power supply PS1 via a (wired or wireless) communication link 204 for sending and/or receiving analog and/or digital signals to/from the first power supply PS1. FIG. 3 illustrates a similar system 300 in which the phase current controller 202 is also coupled to the second power supply PS2 via the communication link 204. In FIGS. 2 and 3, one or both of the power supplies PS1, PS2 may be configured to adjust the amount of DC power it supplies to the load based on one or more signals from the phase current controller 202.

The phase current controller 202 shown in FIGS. 2 and 3 may be configured to monitor the input phase currents iA, iB for power supplies PS1, PS2 via current sensors 206, 208 or other suitable means. Accordingly, the phase current controller 202 may be configured to send signals for adjusting the DC output currents I1, I2 of one or both of the power supplies PS1, PS2 as necessary to reduce imbalances between the input phase currents iA, iB (i.e., without requiring changes to the overall amount of DC power supplied to the load). Alternatively, the phase current controller 202 may be configured to monitor and reduce phase current imbalances at other locations in the polyphase power distribution system, rather than at the inputs 102, 106.

Figure 4:
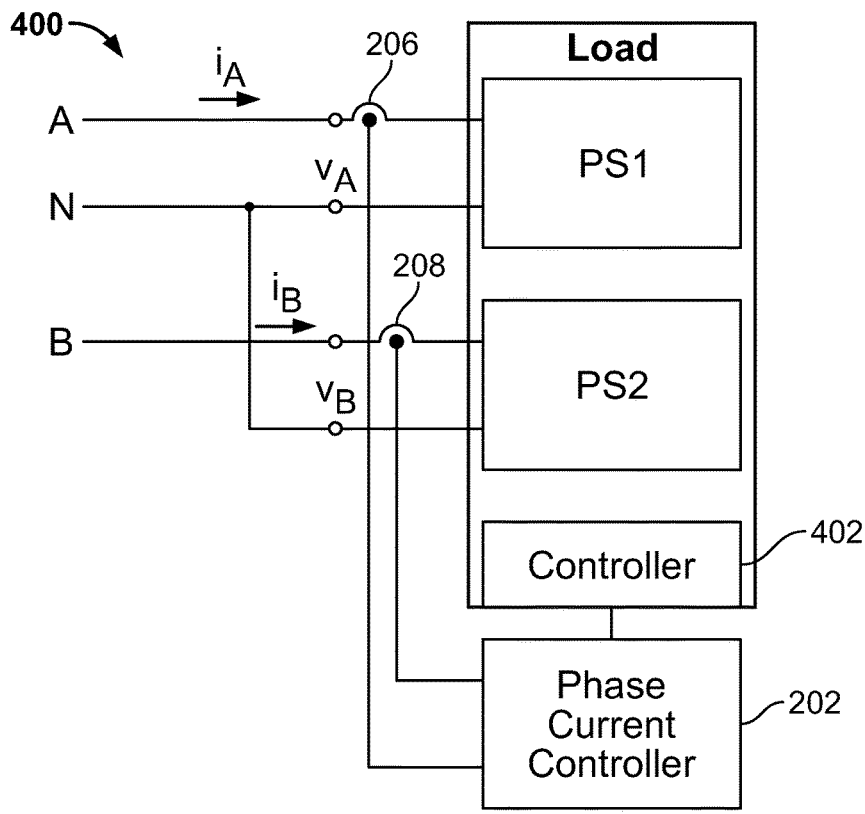
FIG. 4 is a block diagram of an example system in which the power supplies shown in FIG. 3 reside in the load.

The phase current controller 202 may communicate directly with the power supplies, as shown in FIGS. 2 and 3. Alternatively, the phase current controller 202 may communicate with one or more other devices that communicate, directly or indirectly, with the power supplies. One example of this is illustrated in FIG. 4, where the power supplies PS1, PS2 are incorporated into and hosted by the load. The load includes a controller 402. The phase current controller 202 may be configured to adjust the relative current sharing between the power supplies PS1, PS2 by sending one or more signals to the load controller 402. In response, the load controller 402 may send one or more signals to the power supplies PS1, PS2 to adjust their DC output currents. The load may be, for example, a computer server that includes N+1 redundant power supplies fed by different phase voltages, where N is an integer ≥1. In the particular example shown in FIG. 4, the load (e.g., computer server) includes only two redundant power supplies PS1, PS2 (i.e., N=1).

The signals provided by the phase current controller 202 to the power supplies PS1, PS2 (or an intermediate device like the load controller 402) can take a variety of forms. For example, the phase current controller 202 may provide a signal instructing a particular power supply to operate at a specific output voltage or current level. Alternatively, the signal may represent an adjustment to a present operating parameter of the power supply. For example, the signal may indicate the power supply PS1 should increase its present output voltage level by one percent. The magnitude and/or the frequency of these adjustments can be limited as may be necessary or desirable (e.g., for system stability).

One or both of the power supplies PS1, PS2 shown in FIGS. 1-4 may be configured to adjust its DC output power in multiple different ways. For example, each power supply PS1, PS2 may be configurable via a switch, software instructions or other suitable means to adjust the amount of DC power it supplies to the load in response to (i) its input phase voltage, and/or (ii) one or more control signals from a phase current controller.

Although the phase current controller 202 is illustrated external to the power supplies PS1, PS2 in FIGS. 2-4, the phase current controller may instead be incorporated into one or more power supplies, devices hosting the power supplies, or other devices.

With further reference to FIGS. 1-4, one or both power supplies PS1, PS2 may also incorporate an output current sharing function intended to balance the output currents I1, I2 (so the output currents I1, I2 are the same). For example, one or both power supplies PS1, PS2 may incorporate a droop current share function, so the output voltage of each power supply PS1, PS2 is reduced linearly between no load and full load. With this arrangement, a power supply having a 12 VDC output may employ a droop voltage of 100 mV from no load to full load. Therefore, as the power supply outputs more current, its output voltage is gradually reduced, causing the power supply to become less competitive with other power supplies connected in parallel to the same load. This can result in balanced output currents.

Similarly, one or both power supplies PS1, PS2 may incorporate a master slave current sharing function in which each power supply communicates its output current level to other power supplies connected in parallel by sending an analog or digital communication signal via a communication link. For example, each power supply PS1, PS2 may generate an analog output current communication signal between zero and eight volts, indicating the amount of DC current it is supplying to the load. The power supply delivering the highest current automatically becomes the master. Each other power supply (slave) may attempt to reduce the imbalance in output currents by increasing its output voltage, thereby causing it to supply more current to the load. The process then repeats, sometimes resulting in a new master and slave(s), until equilibrium is reached and all power supplies are sharing the load current equally. As apparent to power supply designers, the droop current sharing function and the master slave current sharing function are merely two examples of the many different output current sharing functions that can be incorporated into the power supplies PS1, PS2.

If the power supplies PS1, PS2 incorporate output current sharing functions, each power supply may be configured to adjust the amount of DC power supplied to the load by adjusting its output current sharing behavior. For example, one or both power supplies PS1, PS2 may adjust an output current sharing parameter based on its input phase voltage. For example, if the power supply PS1 employs a droop voltage of 100 mV (i.e., at full load), and its input phase voltage is 235V instead of a nominal 230V, the droop voltage may be adjusted to (230V÷235V)×100 mV=97.87 mV (i.e., to decrease the slope of the droop voltage function).

Similarly, if the power supplies PS1, PS2 employ a master slave current sharing function, the power supply PS1 may adjust its output current communication signal based on its input phase voltage. For example, if the power supply PS1 is operating at full load when its input phase voltage is 225V instead of a nominal 230V, its output current communication signal may be adjusted to (230V÷225V)×8V=8.178V. As a result, the power supply PS1 may become the master, causing the output current I1 to decrease and the output current I2 to increase. This may result in unequal output currents I1, I2, but can advantageously reduce or eliminate phase current imbalances at the inputs 102, 106 and/or elsewhere in the system.

With further reference to FIGS. 2-4, one or both power supplies PS1, PS2 may also (or instead) adjust its output current sharing behavior based on one or more signals from the phase current controller 202, the load controller 402 or another device functionally interposed between the power supplies and a phase current controller. For example, if the phase current controller 202 determines that iA<iB, it may command power supply PS1 to modify a current sharing parameter (e.g., its droop voltage, output current communication signal, or other parameter) to increase its DC output current. Again, this may result in unequal output current sharing, but can advantageously reduce or eliminate phase current imbalances at the inputs 102, 106 and/or elsewhere in the system. As alluded to above, this adjustment to the current sharing parameter in response to a command from a controller described herein may be in addition to an adjustment in response to the input phase voltage. Thus, a power supply may initially adjust its output current sharing parameter in response to its input phase voltage as described above, and subsequently adjust its output current sharing parameter in response to a command from a controller.

The phase current controller (and other controllers described herein) may communicate with the current sensors 206, 208, the power supplies PS1, PS2, and/or other devices (including devices hosting the power supplies PS1, PS2, intermediate controllers, etc.) using any suitable wired or wireless means. Similarly, the power supplies PS1, PS2 may communicate with each other (e.g., to implement a master slave current sharing function) using any suitable means. Some examples include wireless communications, SNMP using the TCP/IP or other protocol, AC power line communication signals, serial ports (e.g., via a computer server's service processor), etc.

Figure 5:
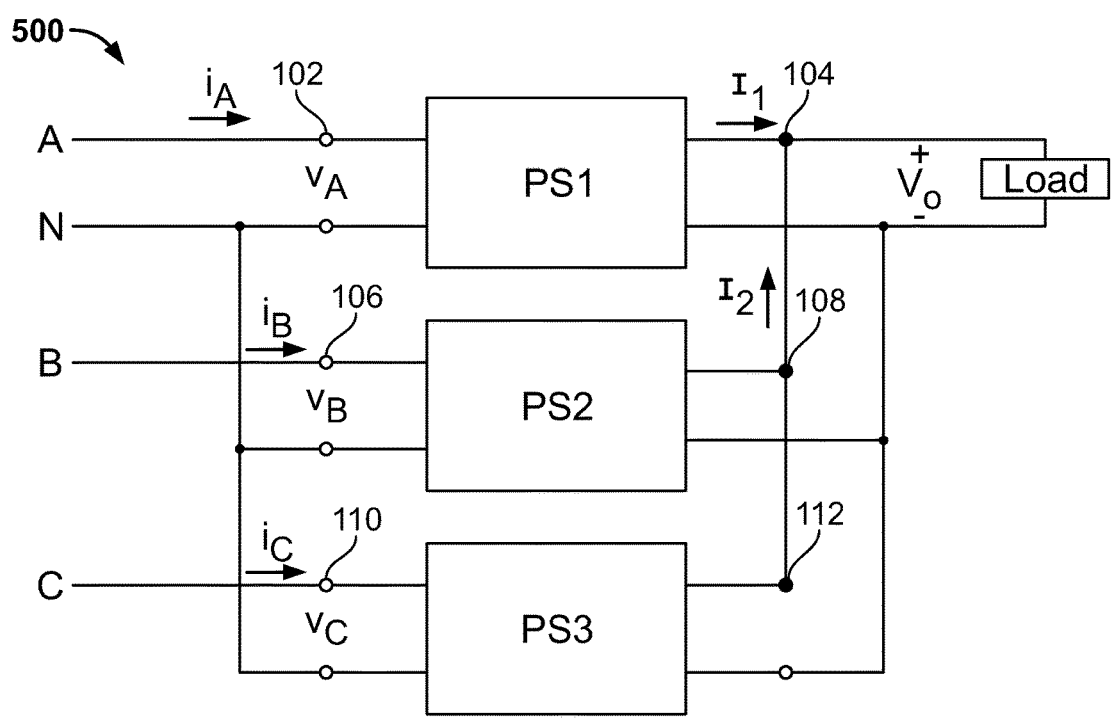
FIG. 5 is a block diagram of a system having three redundant power supplies coupled to different phase voltages in a three phase power distribution system.

FIG. 5 illustrates a three phase system 500 according to another example embodiment. The system 500 is similar to the system 100 of FIG. 1, but includes a third power supply PS3 having an input 110 fed by a third phase voltage vC, and an output 112 coupled in parallel with the outputs 104, 108 of power supplies PS1, PS2. The phase shift between each of the first, second and third phase voltages vA, vB and vC in FIG. 2 is preferably one hundred twenty degrees.

Each power supply PS1, PS2, PS3 in FIG. 5 may be configured as desired for a given application, and may be configured the same or differently than other power supplies. For example, each power supply PS1, PS2, PS3 may be configured to adjust its constant output voltage level in response to its input phase voltage. In that event, the power supplies may automatically reduce or eliminate differences between the input phase currents iA, iB, iC that could otherwise result from differences among the input phase voltages vA, vB, vC. Additionally, or alternatively, one or more of the power supplies PS1, PS2, PS3 may be configured to adjust its DC output power in response to a command from a controller (not shown in FIG. 5), including any of the controllers described herein.

While FIGS. 1-5 illustrate only one power supply fed by each phase voltage vA, vB, vC, it should be understood that each phase voltage may feed two or more power supplies (e.g., as shown in FIGS. 6-8 and 10-13). Further, the number of power supplies fed by a particular phase voltage may be the same or different than the number of power supplies fed by another phase voltage in the same system.

Additionally, when a phase current controller is employed, the phase current controller may be configured to independently control each power supply (directly or via intermediate device(s)), as described herein. Alternatively, the phase current controller may be configured to control two or more power supplies as a group. For example, the phase current controller may adjust each power supply fed by a particular phase voltage in the same manner to reduce imbalances between the associated phase current and another phase current. The phase current controller may also be configured to adjust the performance of redundant power supplies (directly or indirectly, independently or in groups) coupled to two or more loads, rather than a single load as shown in FIGS. 2-5.

Figure 6:
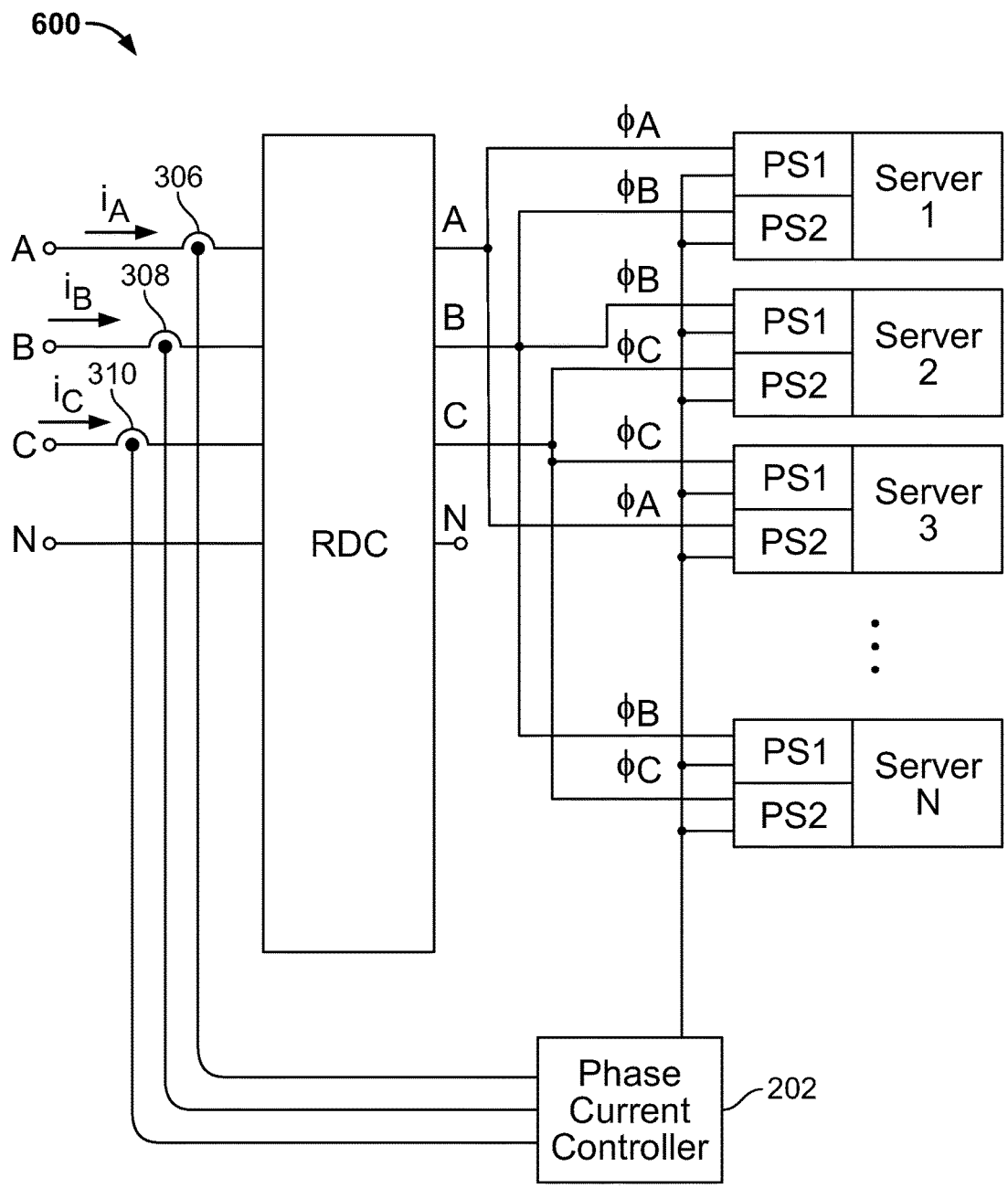
FIG. 6 is a block diagram of another example system having a phase current controller in direct communication with redundant power supplies residing in various computer servers.

FIG. 6 illustrates a system 600 according to another example embodiment of this disclosure. As shown in FIG. 6, the system 600 includes a remote distribution unit (RDC), multiple computer servers, and a phase current controller 202. The RDC is a floor mounted device containing electrical panel boards and circuit breakers that "break up" one or more trunks of the three phase power distribution system into smaller capacity, protected legs for supplying power to, e.g., the computer servers (which may reside in one or more server racks). Each computer server includes N+1 single phase redundant power supplies, where N is an integer greater than or equal to 1. In the particular embodiment illustrated in FIG. 6, N=1 such that each computer server includes two single phase power supplies PS1, PS2. The RDC receives a three phase, four wire (i.e., wye) power line from a power distribution unit (not shown) for powering the power supplies PS1, PS2 in the servers. (The neutral line connections are not shown in FIG. 6 for clarity). The various power supplies PS1, PS2 shown in FIG. 6 may be configured (the same or differently) as described herein. The power supplies PS1, PS2 for each computer server shown in FIG. 6 have their outputs coupled in parallel, and their inputs coupled to different phase voltages.

The phase current controller 202 is configured to monitor the input phase currents iA, iB, iC to the RDC via current sensors 306, 308, 310 or other suitable means. Further, the phase current controller 202 is configured to adjust the amount of DC current supplied by the various power supplies PS1, PS2 in FIG. 6 as necessary to reduce imbalances between the phase currents iA, iB, iC. This can be accomplished in many different ways. For example, the phase current controller may be configured to independently control the output voltage level of each power supply PS1, PS2 shown in FIG. 6.

In one preferred embodiment, each power supply PS1, PS2 shown in FIG. 6 is configured to implement an output current sharing function, and is configured to adjust its output current sharing behavior in response to control signals provided (directly or indirectly) to the power supplies by the phase current controller 202. With this arrangement, the phase current controller 202 may be configured to command the power supplies fed by the particular phase with the lowest phase current to increase their DC output currents (e.g., by adjusting their current sharing behavior). When the power supplies respond, their input phase current will increase, and one or both of the other two phase currents will decrease. This process may continue until the phase current of the lowest loaded phase approximately equals the phase current of the next highest (medium) loaded phase. At that point, the phase current controller 202 may command the power supplies fed by the phase with the highest phase current to decrease their DC output currents until the three phase currents iA, iB, iC are substantially equal. Alternatively, the controller may be configured to adjust the input phase currents in another suitable manner. For example, the controller 202 may first reduce the DC output currents of the power supplies fed by the highest loaded phase current until it is approximately the same as the phase current of the medium loaded phase, and then increase the DC output currents of the power supplies fed by the lowest loaded phase current until the three phase currents are substantially equal.

The magnitude and frequency of the adjustments generated by the phase current controller 202 may be limited. For example, the current sharing behavior of a given power supply may be changed slowly so as not to interfere with various stages or operations in the power supply. The adjustment rate may be, e.g., one tenth of the rectified input frequency. Thus, for a 60 Hz AC signal having a rectified frequency of 120 HZ, an update speed of 10-12 Hz (i.e., no more than every 80-100 mSec) may be employed. Similar, the magnitude of each adjustment may be limited to, e.g., no more than a ten percent (or five percent, or one percent) change to a present operating condition (such as output current, output voltage, a current sharing parameter, etc.). The magnitude of each adjustment may also (or instead) be based on the extent of phase current imbalances.

Figure 7:
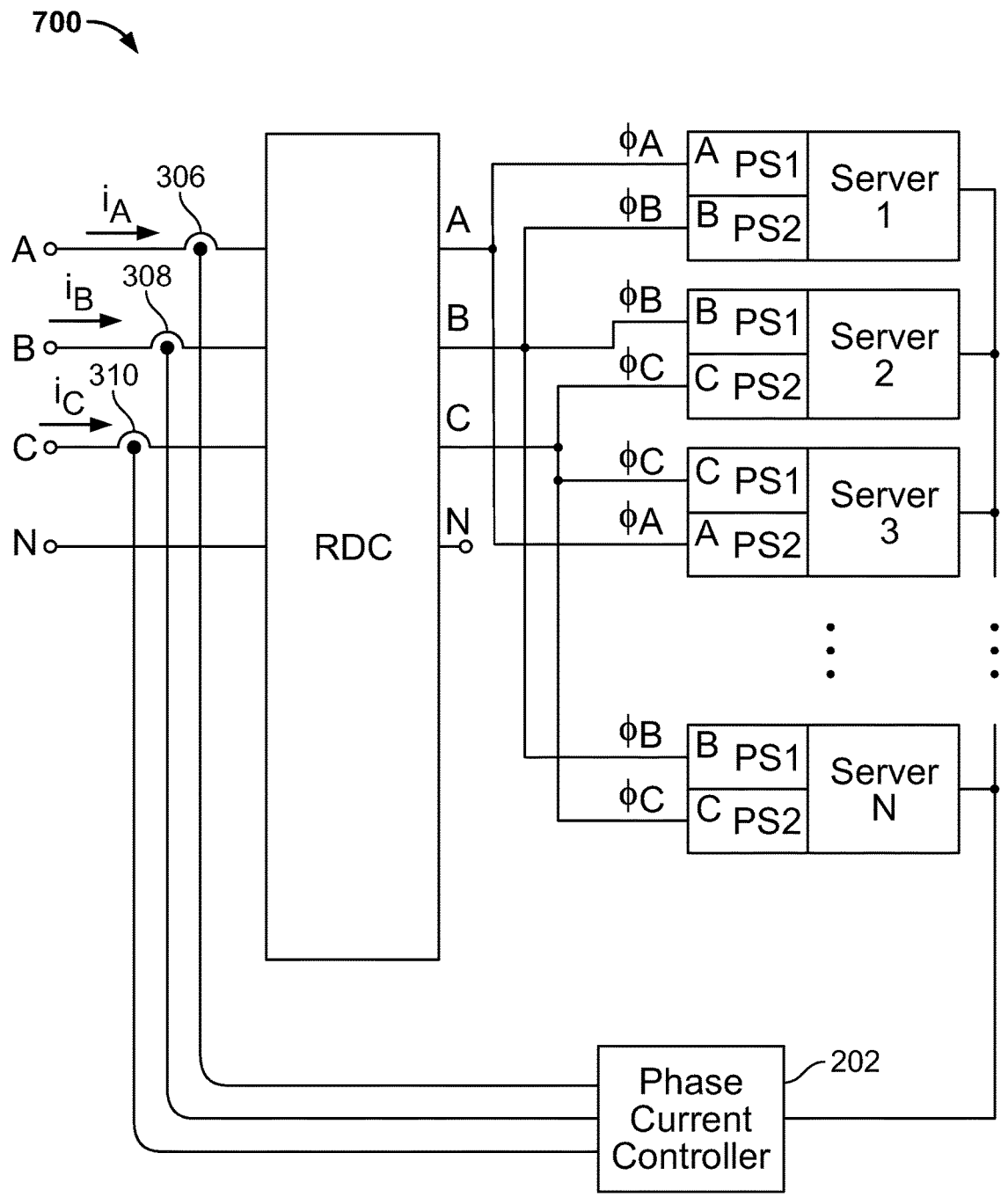
FIG. 7 is a block diagram of another example system having a phase current controller in communication with various computer servers for controlling redundant power supplies residing in the computer servers.

FIG. 7 illustrates a system 700 according to another example embodiment of the present disclosure. The system 700 is similar to the system 600 of FIG. 6, except the phase current controller 202 communicates with the computer servers hosting the power supplies PS1, PS2, rather than communicating with the power supplies directly. The computer servers preferably include controllers (not shown in FIG. 7) for communicating with the phase current controller 202, and for providing control signals to the power supplies PS1, PS2 based on control signals provided by the phase current controller 202.

While the various power supplies PS1, PS2 in FIGS. 6 and 7 are shown incorporated into the computer servers, they could instead by coupled in parallel with one another to form a bulk DC power bus, with each computer server coupled to the DC power bus for receiving power therefrom. For example, in the system 800 of FIG. 8, the RDC supplies power to a power shelf 804 that includes multiple single phase AC/DC power supplies each fed by a particular phase voltage. The power shelf 804 further includes a load controller (also called a shelf controller 806) coupled to the phase current controller 202, and to the various power supplies in the power shelf 804, via one or more communication links. The phase current controller 202 monitors the input phase currents iA, iB, iC to the RDC, and provides control signals to the shelf controller 806 for reducing phase current imbalances. In response, the shelf controller 806 provides signals to the various power supplies in the power shelf 804 to adjust their DC power outputs (i.e., to adjust the extent of current sharing among the various power supplies).

The power supplies in the power shelf 804 may each incorporate a current sharing function, and the shelf controller 806 may adjust their current sharing behavior in response to control signals from the phase current controller 202. As an example, the shelf controller 806 may adjust the operation of each power supply fed by a particular phase in the same manner, as described above.

Figure 8:
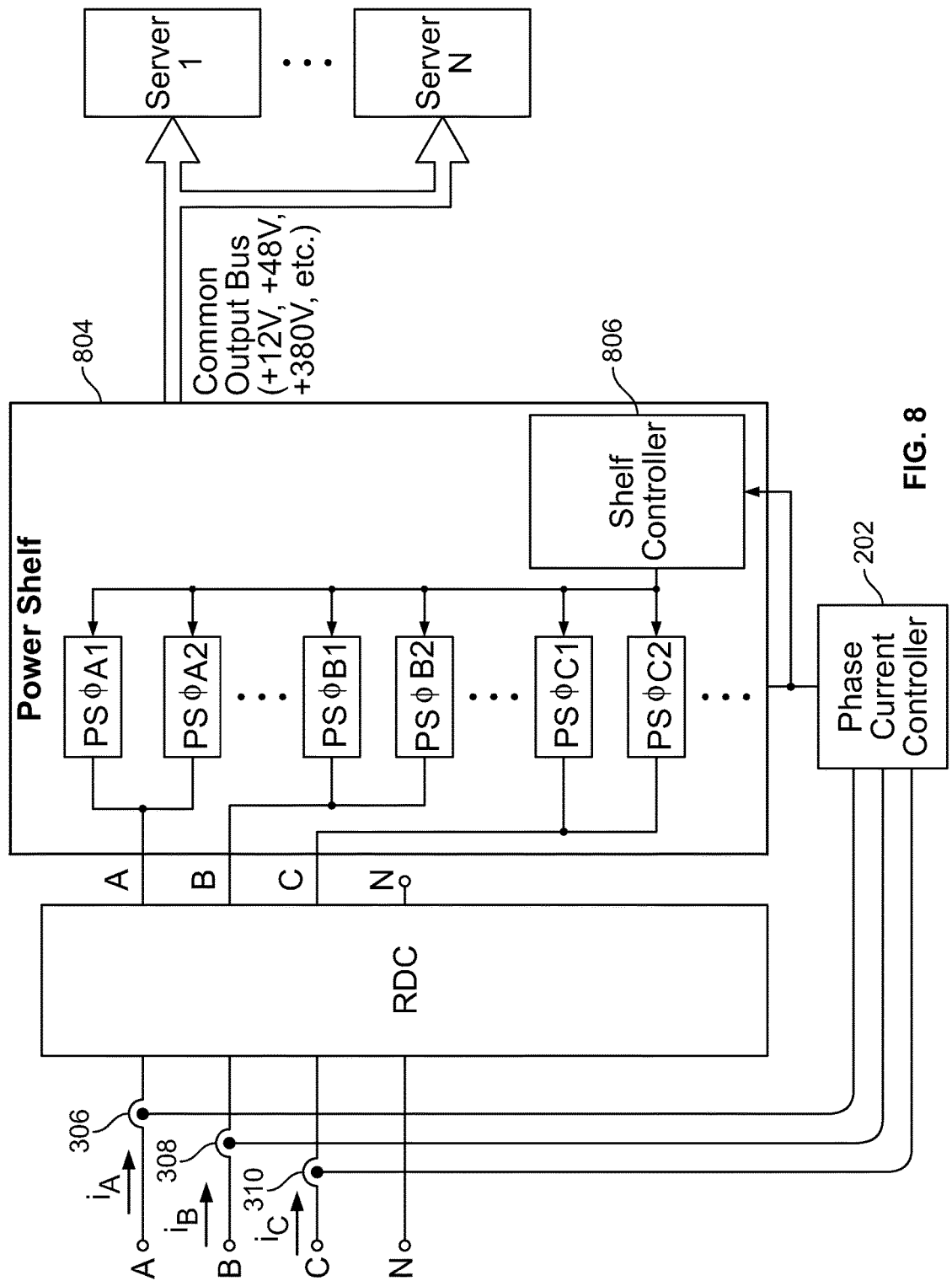
FIG. 8 is a block diagram of another example system having a phase current controller in communication with a shelf controller for controlling multiple redundant power supplies coupled in parallel to a common DC bus.

With further reference to FIG. 8, the outputs of the power supplies in the power shelf 804 may be coupled in parallel to provide a DC output bus having a desired voltage level (such as 12 VDC, 48 VDC, 380 VDC, etc.). The DC output bus can be used to power a variety of single phase loads, including computer servers, etc. The computer servers may reside in one or more server racks coupled to and supplied by the DC output bus. In the example embodiment of FIG. 8, the computer servers are not powered by (and need not include) internal AC/DC power supplies.

The various power supplies and controllers described or illustrated herein may be implemented with analog and/or digital circuits. Preferably, each power supply and controller includes one or more digital processors, such as a microprocessor, a microcontroller, a digital signal processor (DSP), etc. configurable with software instructions and data stored in onboard and/or external memory.

Figure 9:
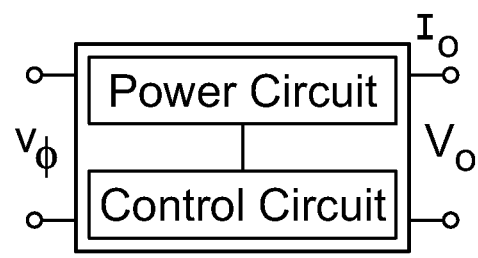
FIG. 9 is a block diagram of an example power supply.

FIG. 9 illustrates an example power supply suitable for use in the various example systems described herein. The power supply includes an input for coupling to an input phase voltage vϕ, an output for supplying DC power to a load, a power circuit coupled between the input and the output, and a control circuit for controlling operation of the power circuit. The power supply is preferably a switched mode power supply (SMPS) employing any suitable topology. The power supply may be a non-isolated power supply or an isolated power supply (e.g., having one or more transformers in the power circuit and one or more isolating components such as opto-couplers in the control circuit). The control circuit preferably includes one or more digital processors. The power supply of FIG. 9 may be configured to operate like any one or more of the power supplies described herein.

Figure 10:
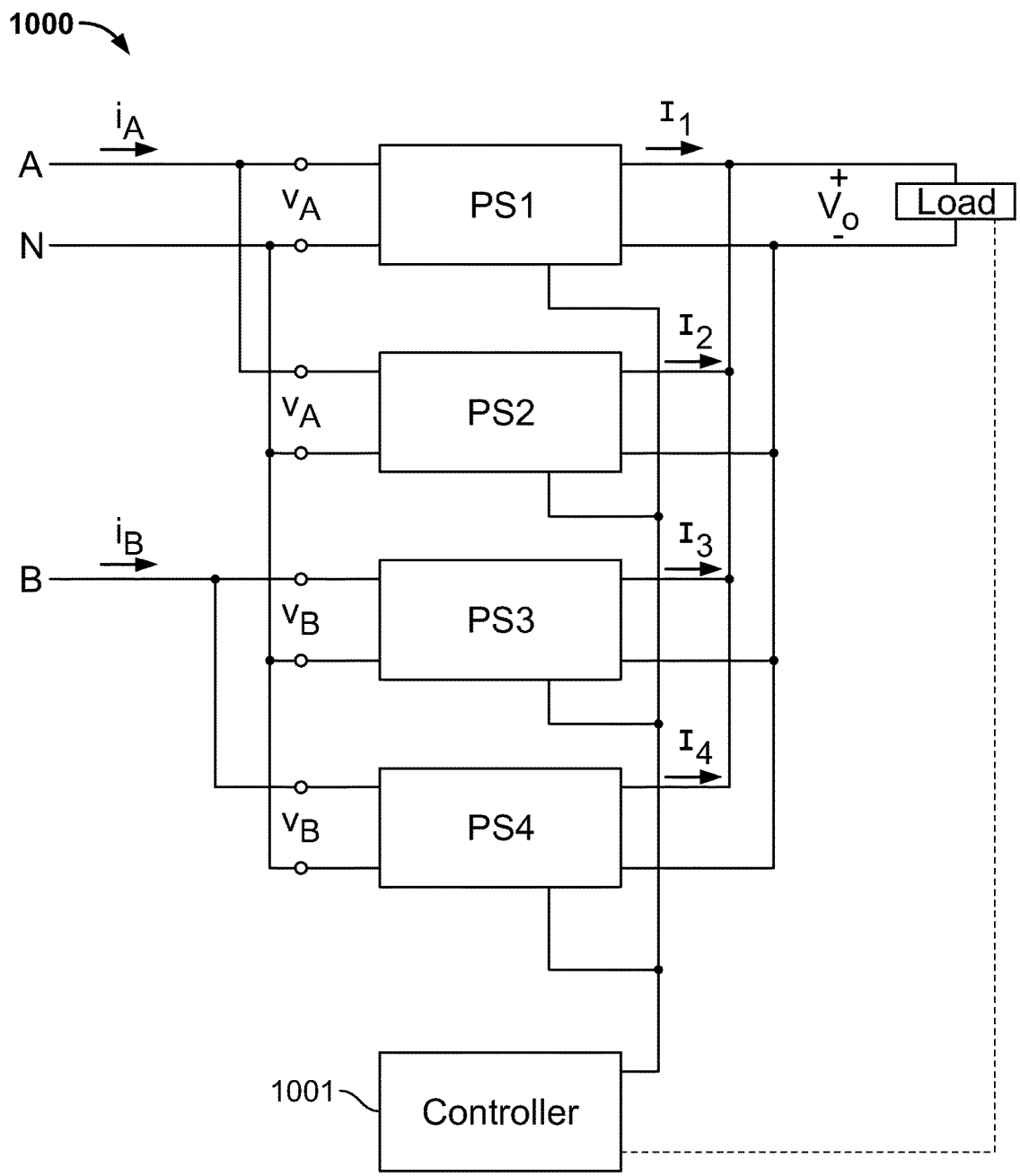
FIG. 10 is a block diagram of another example system having a controller configured to increase the output current of one or more power supplies in response to another power supply shutting down to avoid or reduce phase current imbalances.

FIG. 10 illustrates a system 1000 according to another example embodiment of the present disclosure. As shown in FIG. 10, the system 1000 includes two power supplies PS1, PS2 having inputs coupled to a first phase voltage vA in a polyphase power distribution system, and two power supplies PS3, PS4 having inputs coupled to a second phase voltage vB. Like other embodiments, the power supplies PS1-PS4 are single phase AC/DC power supplies having outputs connected in parallel for supplying a DC power bus having a substantially constant DC voltage (such as 12V, 48V, 380V, etc.) to a load.

One or more of the power supplies PS1-PS4 may be configured to reduce phase current imbalances in the polyphase power distribution system as described above.

At light load operating conditions, some of the power supplies PS1-PS4 may be turned off to optimize efficiency. For example, power supplies PS1 and PS3 may be turned off at the same time. In that event, the phase currents iA, iB may remain substantially balanced (i.e., equal), because the number of active power supplies coupled to each phase voltage vA, vB will remain the same.

However, in some cases, the number of power supplies turned off per phase voltage may be different. For example, power supply PS1 may be turned off while power supplies PS2-PS4 remain active. This can result in unbalanced phase currents iA, iB, because the phase current iB drawn by active power supplies PS3, PS4 will be twice the phase current iA drawn by active power supply PS2 when the DC output currents I2, I3, I4 are the same.

To address this situation, the system 1000 includes a controller 1001 coupled to each of the power supplies PS1-PS4 for avoiding or reducing phase current imbalances when the number of power supplies turned off per phase is different. For example, in the situation described above, when only power supply PS1 is turned off, the controller 1001 responds by increasing the DC current I2 supplied to the load by power supply PS2. Preferably, the controller 1001 will double the amount of current I2 supplied to the load, so the amount of phase current iA drawn by power supply PS2 will be the same as the amount of phase current iB drawn by power supplies PS3, PS4, while the overall amount of DC current supplied to the load remains constant.

Conversely, the controller 1001 may be configured to decrease the DC current I2 supplied to the load by power supply PS2 when the power supply PS1 is turned on. Preferably, the controller 1001 will halve the amount of current I2 supplied to the load when the power supply PS1 is turned on, so the amount of phase current iA drawn by power supplies PS1, PS2 will be the same as the amount of phase current iB drawn by power supplies PS3, PS4, while the overall amount of DC current supplied to the load remains constant.

For this purpose, the controller 1001 preferably includes data (e.g., stored in onboard or external memory) indicating which of the power supplies are coupled to the first phase voltage vA, and which of the power supplies are coupled to the second phase voltage vB.

The controller may be configured to increase (or decrease) the DC current supplied to the load by one or more of the power supplies PS1-PS4 by adjusting one or more of the power supplies' output current sharing behavior. For example, suppose the power supplies PS1-PS4 employ a master slave current sharing function, in which 8V represents the maximum rated output current. In that case, when only the power supply PS1 is turned off, the controller may respond by commanding the active power supply PS2 to multiply its maximum current sharing parameter by ½, so 4V will represent its maximum rated output current. As a result, the power supply PS2 will need to deliver twice as much current to the load as power supplies PS3, PS4 to stabilize the current sharing (i.e., so each power supply PS2-PS4 outputs a current communication signal of 4V).

Similarly, suppose the power supplies PS1-PS4 are configured to supply an output voltage of 48V, and employ a droop current share function having a droop voltage of 0.5V at full load. In that case, when only the power supply PS1 is turned off, the controller may respond by commanding the active power supply PS2 to multiply its droop voltage representing full load by ½, so it will have a droop voltage of 0.25V at full load. As a result, the power supply PS2 will need to deliver twice as much current to the load as power supplies PS3, PS4 when the output bus voltage is 47.75V.

More generally, the multiplier employed by the controller 1001 may be equal to the number of active power supplies on a given phase divided by the total number of power supplies for that phase. Thus, if there is only one active power supply on a given phase (e.g., PS2) and a total of two power supplies (e.g., PS1, PS2) for that phase, the multiplier is equal to ½, as noted in the above example. If, instead, there is a total of three power supplies per phase, and only one power supply is turned off such that two power supplies are active, the multiplier is equal to ⅔, or 0.666. Preferably, the multiplier is used to adjust the current sharing parameter/value associated with full rated load.

Additionally, the controller may be configured to turn off one or more of the power supplies PS1-PS4 in response to a light load condition. For example, the controller 1001 may be configured to monitor the power output by the power supplies PS1-PS4 to detect a light load condition. Alternatively, the controller may receive a signal from another controller, such as a controller in the load (as indicated by the dashed line in FIG. 10), indicative of a light load condition.

Figure 11:
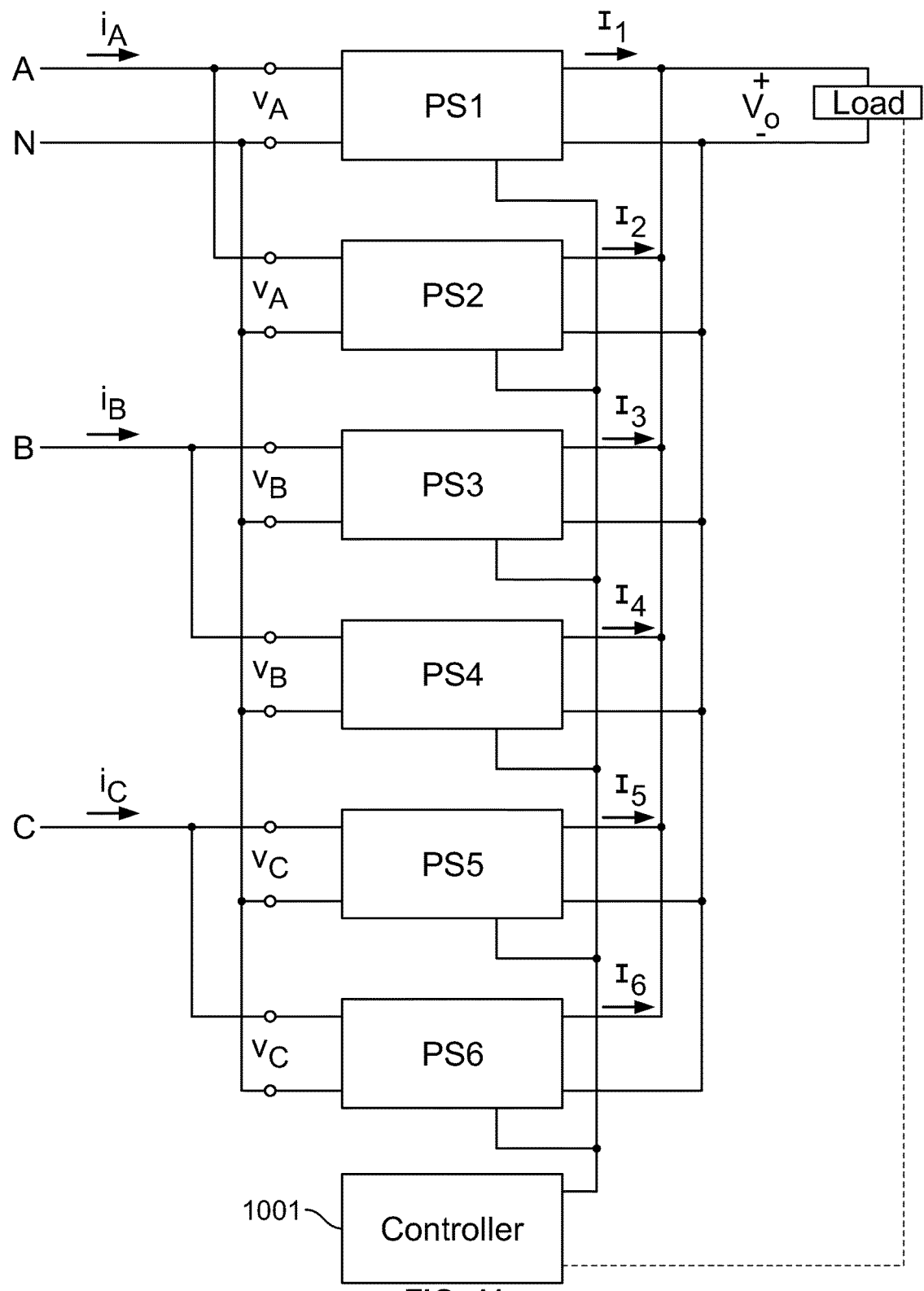
FIG. 11 is a block diagram of a system similar to FIG. 10 but having power supplies fed by three phase voltages.

Although only two phase voltages vA, vB are shown in FIG. 10, the system 1000 may employ three phase voltages vA, vB, vC, as shown in FIG. 11.

Figure 12:
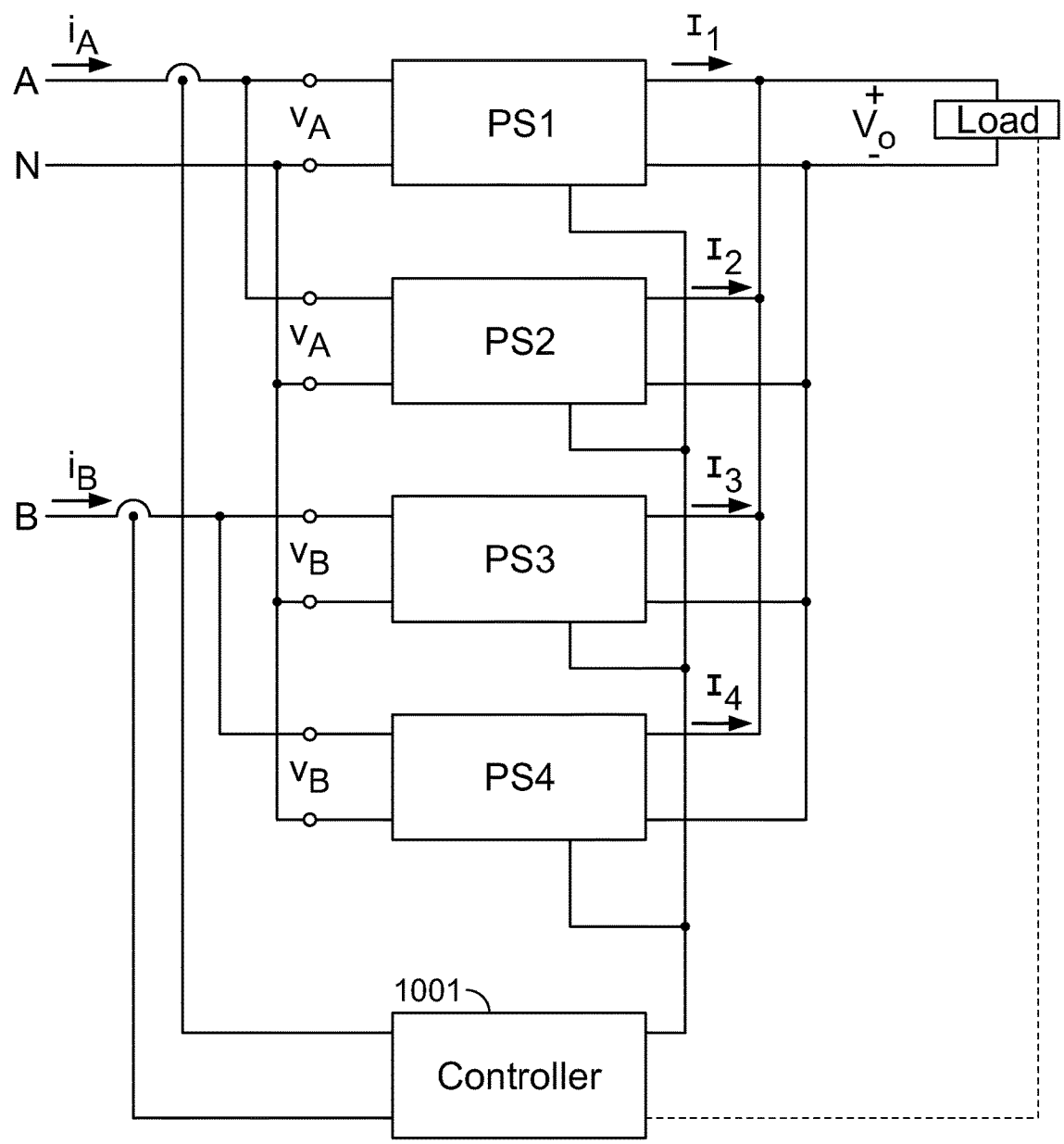
FIG. 12 is a block diagram of a system similar to FIG. 10, where the controller is configured to monitor phase currents.
Figure 13:
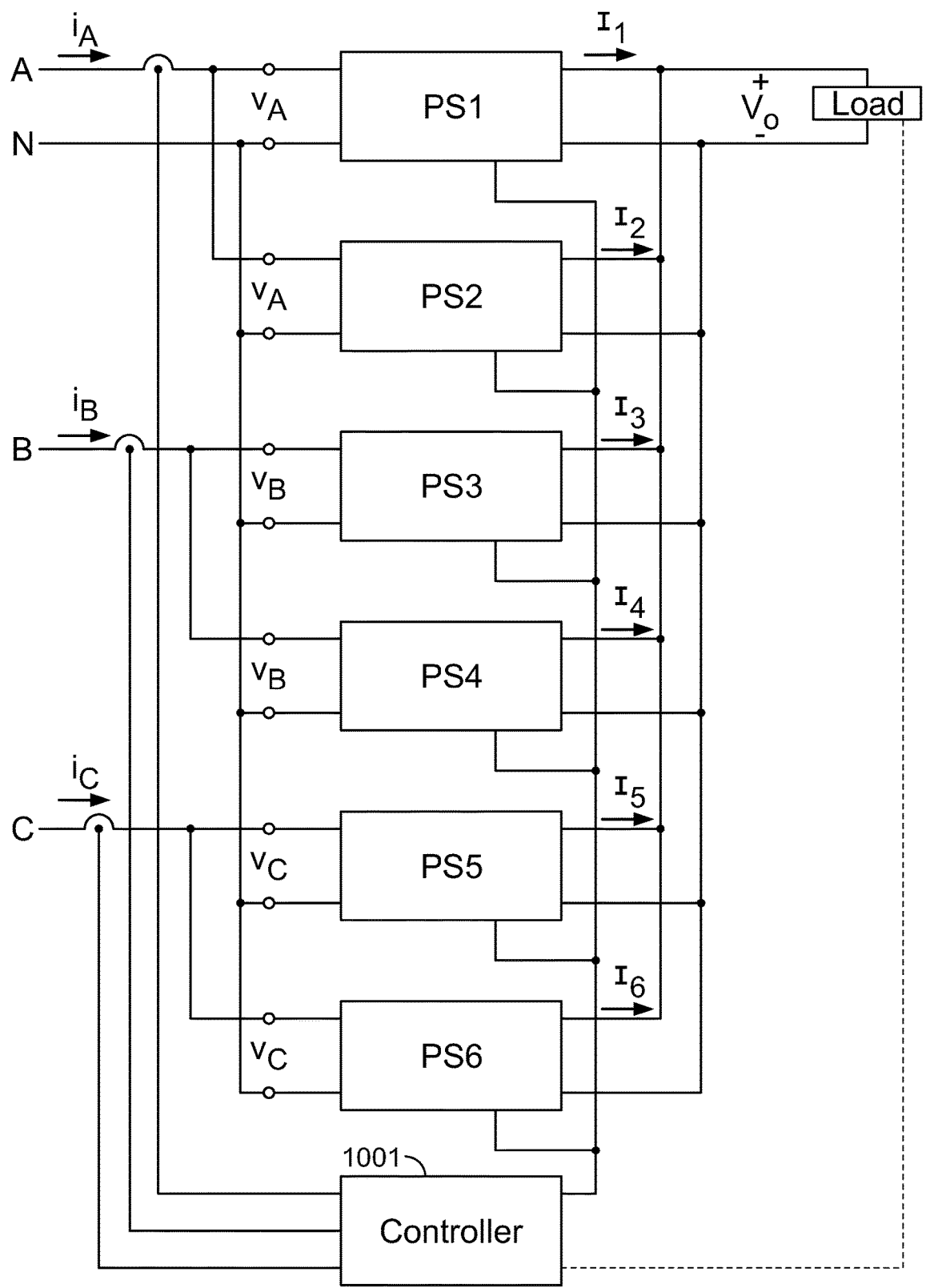
FIG. 13 is a block diagram of a system similar to FIG. 12 but having power supplies fed by three phase voltages.

Further, the controller 1001 may be configured to monitor two or more phase currents iA, iB, iC, as shown in FIGS. 12 and 13, either at the inputs to the power supplies or at other locations in the polyphase power distribution system. In either case, the controller may selectively increase and/or decrease the output currents of one or more power supplies by commanding the power supplies (directly or via intermediate device(s)) to operate at a specific output voltage or current level. In that event, the power supplies need not employ a current sharing mechanism. Alternatively, the controller may command the power supplies to adjust an output current sharing parameter as described herein.

While only two power supplies are illustrated for each phase in FIGS. 10-13, it should be understood that three or more power supplies may be coupled to each phase in any given implementation of these teachings.

Additionally, the load illustrated in FIGS. 10-13 may be any suitable load requiring a DC power source and may include, e.g., one or more computer servers. Further, the systems illustrated in FIGS. 10-13 may include one or more power shelves for housing the various power supplies. The power shelv(es) may receive power from an RDC.

The controller 1001 may be configured to increase the DC current supplied to the load by at least one of the power supplies in response to another one of the power supplies of the same phase shutting down such that the number of active power supplies per phase voltage is different.

It should also be understood that the controllers shown in FIGS. 10-13 may be standalone controllers or integrated into other devices including the power supplies, the load (such as one or more computer servers), a power shelf, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system comprising:
   a first plurality of power supplies each having an input for coupling to a first AC phase voltage in a polyphase AC power distribution system, an output for supplying DC current to a load, and an output current sharing parameter for balancing DC currents;
   a second plurality of power supplies each having an input for coupling to a second AC phase voltage in the polyphase AC power distribution system and an output for supplying DC current to the load;
   the outputs of the first plurality of power supplies and the outputs of the second plurality of power supplies electrically connected in parallel for supplying a substantially constant voltage to the load; and
   a controller;
   wherein the controller is coupled to at least the first plurality of power supplies;
   wherein the first plurality of power supplies and the second plurality of power supplies are single phase AC/DC power supplies; and
   wherein the controller is configured to adjust the output current sharing parameter of at least one of the first plurality of power supplies to adjust the DC current supplied to the load by said at least one of the first plurality of power supplies so that the DC current supplied to the load from the first plurality of power supplies is different than the DC current supplied to the load from the second plurality of power supplies, and wherein the DC current supplied to the load by said at least one of the first plurality of power supplies is adjusted based on a sensed AC input of the first plurality of power supplies or the second plurality of power supplies by an amount necessary to avoid or reduce AC phase current imbalances in the polyphase AC power distribution system.

2. The system of claim 1, wherein the controller is configured to shut down one or more of the first plurality of power supplies in response to a low load condition.

3. The system of claim 2, wherein the controller is configured to shut down one or more of the first plurality of power supplies in response to a signal from another controller indicative of the low load condition.

4. The system of claim 1, wherein the substantially constant voltage is 48 VDC.

5. The system of claim 1, further comprising a power shelf, wherein the first plurality of power supplies and the second plurality of power supplies are positioned in the power shelf.

6. The system of claim 1, further comprising one or more computer servers having inputs coupled to the outputs of the first and second plurality of power supplies.

7. The system of claim 1, further comprising a third plurality of power supplies each having an input for coupling to a third AC phase voltage in the polyphase AC power distribution system and an output for supplying DC current to the load, wherein the third plurality of power supplies are single phase AC/DC power supplies, and wherein the outputs of the third plurality of power supplies are electrically connected in parallel with the outputs of the first plurality of power supplies and the outputs of the second plurality of power supplies.

8. The system of claim 7, wherein the controller is configured to adjust the DC current supplied to the load by said at least one of the first plurality of power supplies in response to another one of the first plurality of power supplies shutting down by an amount necessary to avoid or reduce the AC phase current imbalances in the polyphase AC power distribution system when a number of active power supplies per phase is different.

9. The system of claim 1, wherein the controller is configured to decrease the DC current supplied to the load by said at least one of the first plurality of power supplies in response to another one of the first plurality of power supplies turning on.

10. The system of claim 1, wherein the controller is coupled to the second plurality of power supplies.

11. The system of claim 10, wherein the controller includes data indicating which of the first and second plurality of power supplies are coupled to the first AC phase voltage and which of the first and second plurality of power supplies are coupled to the second AC phase voltage.

12. The system of claim 10, wherein the controller is configured to monitor AC phase currents in the polyphase AC power distribution system and turn on or off one or more of the first and second plurality of power supplies as necessary to avoid or reduce the AC phase current imbalances in the polyphase AC power distribution system.

13. The system of claim 1, wherein the controller is configured to adjust the output current sharing parameter of said at least one of the first plurality of power supplies using a multiplier equal to a total number of the first plurality of power supplies that are active divided by a total number of the first plurality of power supplies.

14. The system of claim 1, wherein the controller is configured to adjust the DC current supplied to the load by said at least one of the first plurality of power supplies in response to another one of the first plurality of power supplies shutting down so the amount of the DC current supplied to the load by said at least one of the first plurality of power supplies is unequal to an amount of DC current supplied to the load by one of the second plurality of power supplies.

15. The system of claim 1, wherein the sensed AC input is an AC voltage or an AC current.

16. The system of claim 1, wherein the controller is configured to adjust the DC current supplied to the load by said at least one of the first plurality of power supplies in response to another one of the first plurality of power supplies shutting down by an amount necessary to avoid or reduce the AC phase current imbalances in the polyphase AC power distribution system when a number of active power supplies per phase is different.

17. The system of claim 1, wherein the controller is configured to adjust the DC current supplied to the load by said at least one of the first plurality of power supplies in response to another one of the first plurality of power supplies shutting down by an amount necessary to avoid or reduce the AC phase current imbalances in the polyphase AC power distribution system when a number of active power supplies per phase is the same.

18. The system of claim 1, wherein the output current sharing parameter of each of the first plurality of power supplies includes a droop voltage current sharing parameter.

19. The system of claim 1, wherein the output current sharing parameter of each of the first plurality of power supplies includes a master slave current sharing parameter.

20. A controller for a system including a first plurality of power supplies each having an input for coupling to a first AC phase voltage in a polyphase AC power distribution system, an output for supplying DC current to a load, and an output current sharing parameter for balancing DC currents, and a second plurality of power supplies each having an input for coupling to a second AC phase voltage in the polyphase AC power distribution system and an output for supplying DC current to the load, the outputs of the first plurality of power supplies and the outputs of the second plurality of power supplies electrically connected in parallel for supplying a substantially constant voltage to the load, wherein the first plurality of power supplies and the second plurality of power supplies are single phase AC/DC power supplies, the controller configured to couple to at least the first plurality of power supplies and to adjust the output current sharing parameter of at least one of the first plurality of power supplies to adjust the DC current supplied to the load by at least one of the first plurality of power supplies so that the DC current supplied to the load from the first plurality of power supplies is different than the DC current supplied to the load from the second plurality of power supplies, wherein the DC current supplied to the load by said at least one of the first plurality of power supplies is adjusted based on a sensed AC input of the first plurality of power supplies or the second plurality of power supplies by an amount necessary to avoid or reduce AC phase current imbalances in the polyphase AC power distribution system.

21. The controller of claim 20, wherein the controller includes data indicating which of the first and second plurality of power supplies are coupled to the first AC phase voltage and which of the first and second plurality of power supplies are coupled to the second AC phase voltage.

22. The controller of claim 21, wherein the controller is configured to shut down one or more of the first and second plurality of power supplies in response to a low load condition.

23. The controller of claim 20, wherein the controller is configured to adjust the DC current supplied to the load by said at least one of the first plurality of power supplies in response to another one of the first plurality of power supplies shutting down by an amount necessary to avoid or reduce the AC phase current imbalances in the polyphase AC power distribution system when a number of active power supplies per phase is different.

24. The controller of claim 20, wherein the controller is configured to adjust the DC current supplied to the load by said at least one of the first plurality of power supplies in response to another one of the first plurality of power supplies shutting down by an amount necessary to avoid or reduce the AC phase current imbalances in the polyphase AC power distribution system when a number of active power supplies per phase is the same.

25. A method of inhibiting AC phase current imbalances in a polyphase AC power distribution system, the system including a first plurality of power supplies each having an input for coupling to a first AC phase voltage, an output for supplying DC current to a load, and an output current sharing parameter for balancing DC currents, and a second plurality of power supplies each having an input for coupling to a second AC phase voltage and an output for supplying DC current to the load, the outputs of the first plurality of power supplies and the outputs of the second plurality of power supplies electrically connected in parallel for supplying a substantially constant voltage to the load, wherein the first plurality of power supplies and the second plurality of power supplies are single phase AC/DC power supplies, the method comprising adjusting the output current sharing parameter of at least one of the first plurality of power supplies to adjust the DC current supplied to the load by at least one of the first plurality of power supplies so that the DC current supplied to the load from the first plurality of power supplies is different than the DC current supplied to the load from the second plurality of power supplies, wherein the DC current supplied to the load by said at least one of the first plurality of power supplies is adjusted based on a sensed AC input of the first plurality of power supplies or the second plurality of power supplies by an amount necessary to avoid or reduce AC phase current imbalances in the polyphase AC power distribution system.

26. The method of claim 25, further comprising shutting down one or more of the first and second plurality of power supplies in response to a low load condition.

27. The method of claim 25, wherein the system further includes one or more computer servers coupled to the outputs of the first and second plurality of power supplies.

28. The method of claim 25, wherein the DC current supplied to the load by said at least one of the first plurality of power supplies is adjusted in response to another one of the first plurality of power supplies shutting down by an amount necessary to avoid or reduce the AC phase current imbalances in the polyphase AC power distribution system when a number of active power supplies per phase is different.

29. The method of claim 25, wherein the DC current supplied to the load by said at least one of the first plurality of power supplies is adjusted in response to another one of the first plurality of power supplies shutting down by an amount necessary to avoid or reduce the AC phase current imbalances in the polyphase AC power distribution system when a number of active power supplies per phase is the same.

* * * * *